United States Patent [19]
Henry

[11] 3,834,042
[45] Sept. 10, 1974

[54] COMPUTATION DEVICE

[76] Inventor: James L. Henry, 3010 S. 74 East Ave., Tulsa, Okla. 74129

[22] Filed: Sept. 7, 1973

[21] Appl. No.: 395,222

[52] U.S. Cl. .................................. 35/9 C, 35/31 C
[51] Int. Cl. ............................................. G09b 7/10
[58] Field of Search .................... 35/9 C, 9 B, 31 C

[56] References Cited
UNITED STATES PATENTS

| | | | |
|---|---|---|---|
| 2,198,894 | 4/1940 | Werner | 35/9 C |
| 2,349,066 | 5/1944 | Witter | 35/9 B |
| 2,586,710 | 2/1952 | Pick | 35/9 C |
| 2,627,672 | 2/1953 | Polton | 35/9 C |
| 2,656,618 | 10/1953 | Pescatori | 35/31 C X |
| 3,009,262 | 11/1961 | Moran | 35/9 B |
| 3,055,113 | 9/1962 | Grandjean | 35/66 X |
| 3,106,784 | 10/1963 | Raley | 35/9 C |
| 3,314,166 | 4/1967 | Styes | 35/9 C |

FOREIGN PATENTS OR APPLICATIONS

| | | | |
|---|---|---|---|
| 352,891 | 6/1905 | France | 35/31C |
| 522,331 | 4/1955 | Italy | 35/31 C |
| 725,471 | 11/1966 | Italy | 35/31 C |

*Primary Examiner*—Wm. H. Grieb
*Attorney, Agent, or Firm*—William S. Dorman

[57] ABSTRACT

Apparatus for indicating correct and incorrect solutions to an equation of two independent variables includes a printed circuit board on which electrically conducting strips are formed in a family of curves representing solutions to a desired equation, such as $xy = Z$. The family of curves is arranged in a manner whereby the distance along one edge of the board represents the value of one of the independent variables, and the distance along another edge of the board represents the value of the other of the independent variables, the intersection of lines parallel to the edges of the board intersecting over the curve representing the solution to the equation of the two variables. The board is mounted between upper and lower frames, the lower frame carrying an electrical contactor which is movable in the two directions of the independent variables to contact the electrically conducting solution curve and impart an electric potential to it. Each of the solution curves is connected to an electrically conducting possible solution member, displayed on the top panel. A test probe is connected to a relay switch to energize the relay when the test probe is brought into contact with the proper solution member to which the voltage is conducted from the solution curve. The test probe contains a switch, operable by pressure on the probe to energize a selected one of two solution indicating lamps, the incorrect lamp being ordinarily selected and the correct answer lamp being selected by positive potential detected by the probe which the relay energizes.

9 Claims, 4 Drawing Figures

COMPUTATION DEVICE

BACKGROUND OF THE INVENTION

1. FIELD OF THE INVENTION

This invention relates to improvements in computational devices, and more particularly to apparatus for indicating correct and incorrect solutions to an equation of two independent variables for selected variable values.

2. DESCRIPTION OF THE PRIOR ART

Educational toys or devices have been proposed, for example, for teaching multiplication tables or addition equations or the like. One such apparatus is shown in U.S. Pat. No. 3,009,262. That patent shows an educational toy in which a lightbulb carried on intersecting perpendicular rod members is moved independently in two directions to locate the lightbulb under an answer. The answer which overlies the positioned lightbulb depends upon the distances the bulb is moved in the perpendicular directions, and indicates, for example, the product of the numbers at their respective distances along the axis from a starting edge.

Another educational device proposed is shown in U.S. Pat. No. 2,586,710, in which a printed circuit board is mounted underlying a perforated board. A pair of probes are inserted into selected holes in the perforated board to contact the printed circuit elements lying thereunder. When the probes are brought into contact with a common printed circuit board strip, a lamp is lighted. The pattern of the printed circuit board strips are, however, designed to be irregular to render memorizing the pattern impossible. Thus, a card may be placed over the perforated board having a list of items to be associated, and because of the irregular pattern of the underlying circuit board, one can locate associated items in random locations upon the card.

Finally, in U.S. Pat. No. 2,627,672, an educational device is shown in which a card or the like having interconnected conductive elements over which a card defining selected mathematical problems and possible solutions is placed. Probes are then used to select the problem and the proper solution, to thereby test the continuity between the two points on the underlying card to energize lightbulbs or the like upon choosing a correct solution.

None of the prior art devices or apparatuses, however, enable the flexability of choosing from a selected range of a number of inputs to obtain a unique answer. Additionally, no provisions are shown in the prior art to obtain such answer from various combinations of the input variables.

SUMMARY OF THE INVENTION

In light of the above, it is, therefore, an object of the invention to present an apparatus for indicating correct and incorrect solutions to an equation of two variables for selected variable values. It is another object of the invention to provide an apparatus which employs a printed circuit board or the like upon which is displayed a family of curves representing solutions to an equation having two independent variables at discreet cartesian coordinate points over the printed circuit board.

These and other objects, features, and advantages will become apparent to those skilled in the art from the following detailed description when read in conjunction with the accompanying drawing and appended claims.

The invention, in its broad aspect, presents an apparatus for indicating correct and incorrect solutions to an equation having two independent variables for selected variable values which includes a board presenting a family of curves of electrically conducting material. Each of the curves represents a solution of the equation of two independent variables. Means are provided for applying a voltage to a selected one of the curves, and, additionally, means are provided for moving the voltage applying means in the direction of first and second coordinates, the distance along each of the coordinates representing the magnitude of one of the independent variables, whereby the voltage applying means is located over the solution to the equation having variables equal to the distances along the coordinates which the voltage applying means is moved. Also, means are provided for contacting a selected one of the curves.

At least two display means are provided, one of which being ordinarily selected for energizing, and a first switch means activated by the potential on the selected curve is provided to enable the other display means to be energized. A second switch means is provided for applying a voltage to energize the selected display means, thereby indicating the correct or incorrect solution chosen.

BRIEF DESCRIPTION OF THE DRAWINGS

The invention as illustrated in the accompanying drawing wherein.

DETAILED DESCRIPTION OF THE PREFERRED EMBODIMENTS

Figure 1:
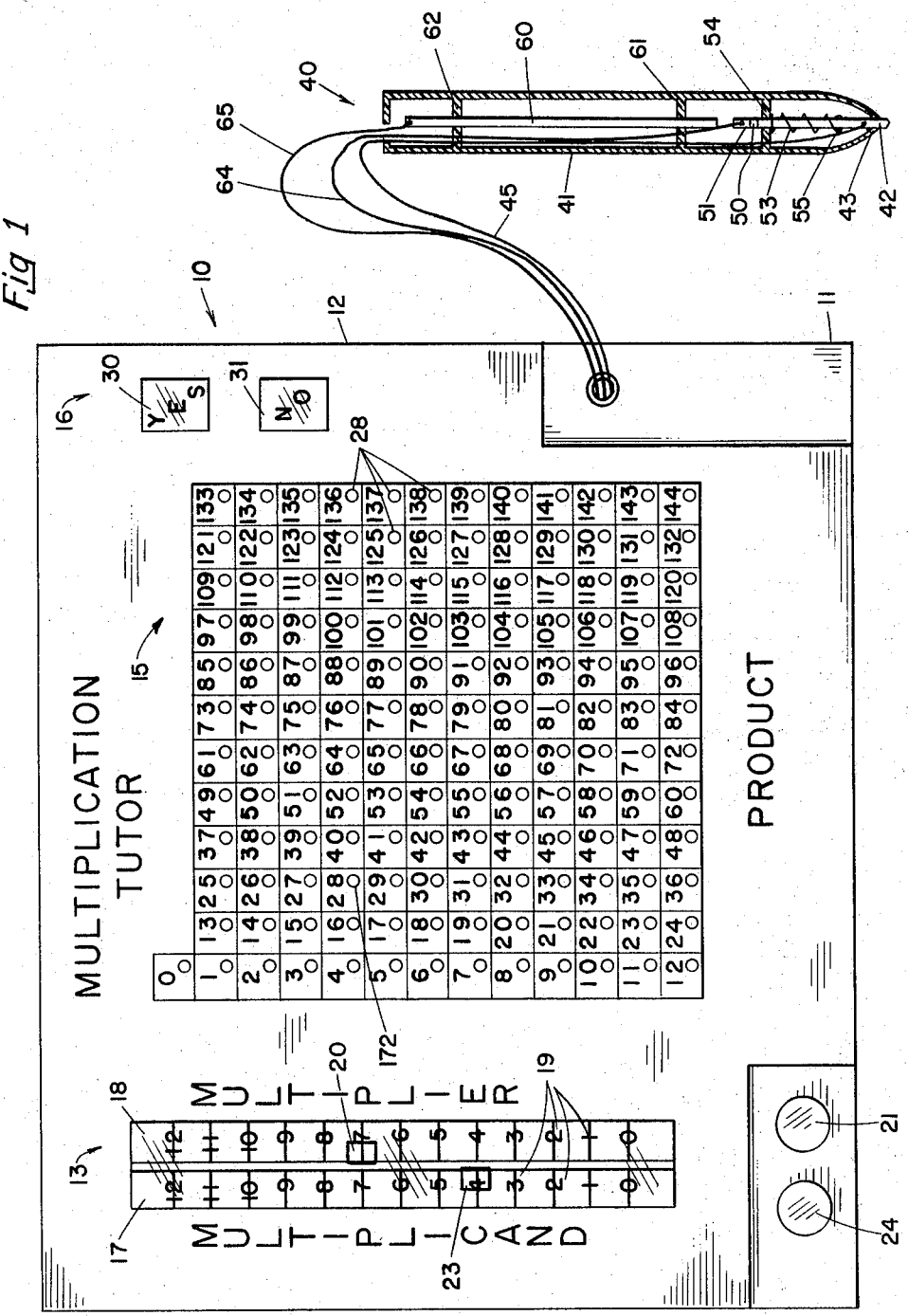
FIG. 1 is a plan view of the top portion of the apparatus, in accordance with the invention, as applied to obtaining multiplication products, showing the contacting probe in cross-section used therewith.

The apparatus, in accordance with the invention, is built in three general layers. The top layer presents the face of the apparatus, as shown in FIG. 1. The intermediate layer is a printed circuit board having a family of solution curves etched thereon, examples of such printed circuit board being shown in FIGS. 3 and 4. The bottom layer, shown in FIG. 2, includes the controls for selecting the input variables and locating the appropriate solution curve of the printed circuit board of the intermediate layer.

With reference now to FIG. 1 of the drawing, the top portion 10 of the apparatus is shown as applied to use in solving the general multiplication formula $xy = z$. The top portion 10 of the apparatus includes a frame 11 of plastic, wood, or other suitable material upon which a faceplate 12 is located. The faceplate 12 is of cardboard or the like, and is removable for substitution with other function or problem presenting faceplates, for example, for addition, subtraction, and so forth as will become apparent. The apparatus includes three main sections, a number input section 13, a solution section 15, and an indicator section 16. The input section, as applied in the multiplication use, includes a multiplicand section 17 and a multiplier section 18 representing, for example x and y, respectively, in the multiplication equation. The multiplier and multiplicand sections are of clear plastic to form windows upon which selection numbers 19 are presented. The windows overlie a hole (not shown) in the frame 11 to enable the multiplier indicators 20 and 23 of the lower portion, described below in detail, to be visible. The number indicators are moved among the various numbers of the multiplier section by knobs 21 and 24 in a manner below described.

The solution section 15 includes blocked in sequence the possible results of the products of the multiplier and multiplicand sections indicated, here, for example, the integers in sequence from 1 to 144. In each of the possible product solution areas, an electrically conducting contactor member is presented, such as the contactors 28. The contactor members 28 are mounted upon the frame 11 and extend through holes in their corresponding locations in the faceplate 12.

Finally, the indicator section 16 includes two windows, of plastic or the like one window 30, indicating "YES" for a correct solution, the other window 31 indicating "NO" for an incorrect solution to the equation to which the apparatus has been applied. The windows overlie holes in the frame 11 to enable the light from lamps carried by the lower portion, below described, in corresponding locations to be seen.

In use, the solution members or contactors 28 are tested with a probe 40. The probe 40 includes an outer insulating shell 41 of plastic or the like by which the probe is handled. An electrically conducting probe tip 42 extends from an opening 43 in the tip of the probe 40, to enable it to be brought into electrical contact with any selected one of the product solution contactors 28 in the solution section 15. A wire 45 is electrically connected at one end with the probe tip 42, and is connected at the other end to a switch means, below described in detail, with reference to FIG. 2, to select an appropriate indicator in the display section 16.

An insulating separator 50 and an electrically conducting rod member 51 are aligned to form a lower probe section with the probe tip 42. This lower probe section is downwardly and outwardly biased by a spring 53 which bears between a supporting ring 54 carried by the insulating shell 41 and a protrusion 55 on the probe tip 42. An upper electrically conducting rod member 60 is mounted between insulating supporting rings 61 and 62 also carried within the shell 41. An electrical connection is made to the lower rod member 51 by a wire 64 and to the upper rod member 60 by a wire 65. The wires 64 and 65 are connected to means, below described, for energizing the lamps of the display section 16. Thus, in operation, after the probe tip 42 is brought into contact with one of the solution contactor members 28, the lower probe section including the probe tip 42, the insulating separator 50, and the lower rod member 51, is moved against the bias of the spring 53 to contact the upper rod member 60, thereby defining a switch to make electrical contact between the electrically conducting rod members 51 and 60 to operate the selected indicator means, below described.

Figure 2:
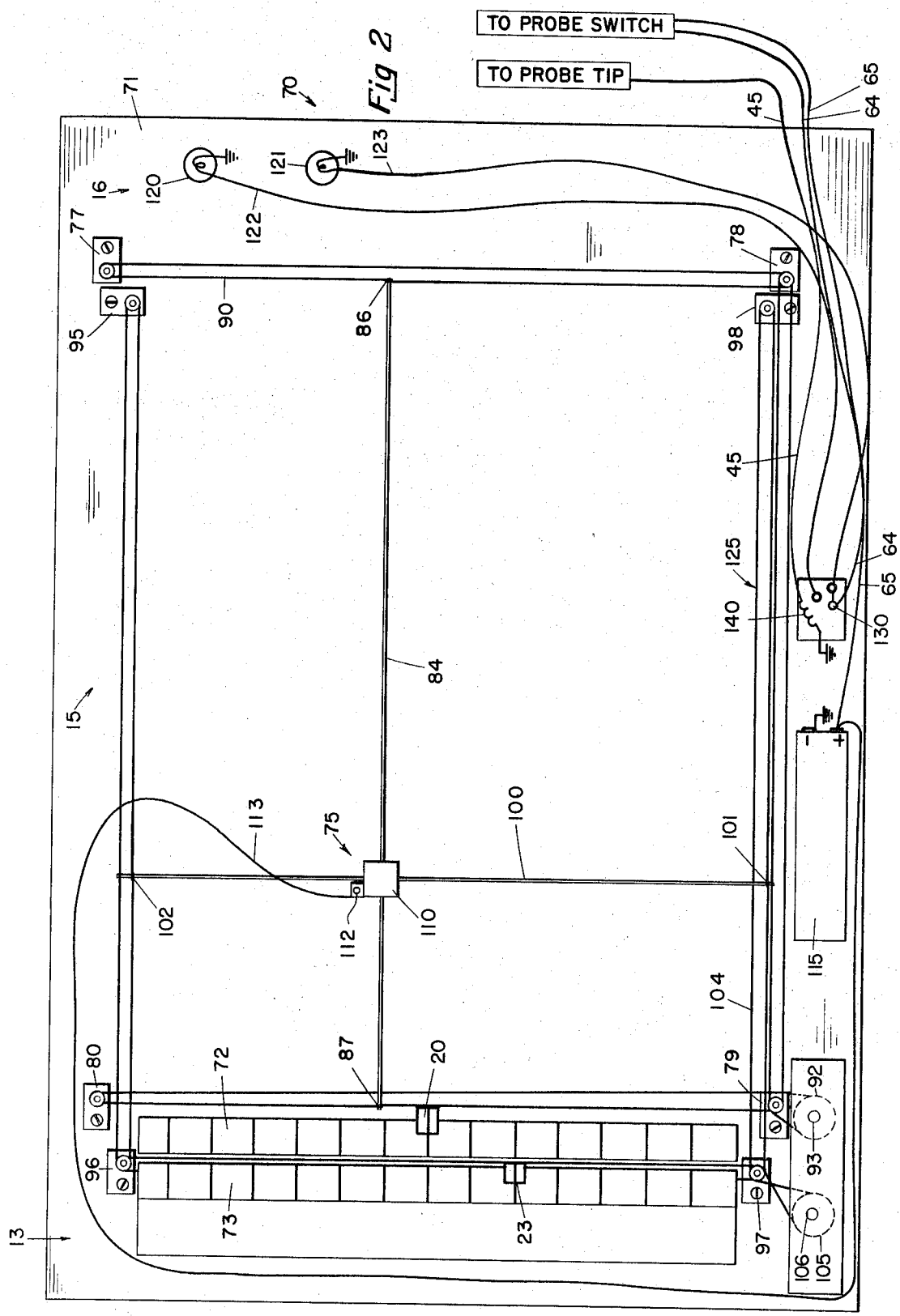
FIG. 2 is a plan view of the bottom portion apparatus separated from the top portion shown in FIG. 1.

With reference now to FIG. 2, the bottom section or layer 70 of the apparatus includes a base frame 71 having an area corresponding to the input section 13 of the face of FIG. 1, upon which is mounted a pair of side by side scales 72 and 73 over which the indicators 20 and 23 are respectively positioned. A means for contacting a selected solution of the intermediate printed circuit board, below described in detail, is indicated generally by the reference numeral 75, and is movable in two directions by a string network as follows. Four pulleys 77, 78, 79, and 80 are mounted near the corners of the solution section 16 to the base frame 71 with screws, as shown, or the like. A horizontally extending crossbar member 84 is slidably connected to the solution contactor assembly 75, and is attached at its ends 86 and 87 to a sring 90, strung in a continuous loop among each of the pulleys 77–80 and a control pulley 92. A shaft 93 is connected to the pulley 92 and extends upwardly through the first layer 10, of FIG. 1, and to which knob 21 is affixed.

In a similar fashion, pulleys 95, 96, 97, and 98 are screwed, as shown, or otherwise affixed to the base frame 71. A vertical crossbar 100, slidably connected to the contactor assemlby 75, is attached at its ends 101 and 102 to a string 104 continuously strung among the pulleys 95–98 and a larger control pulley 105, as shown. An upwardly extending rod or shaft 106 is connected to the control pulley 105, and extends through the upper layer 10, shown in FIG. 1, and to which knob 24 is attached. The indicators 20 and 23 are attached, respectively, to the strings 90 and 104, to be movable up and down their respective scales 72 and 73 as the vertical or horizontal location of the contactor assembly 75 is changed. It can, therefore, be seen that the location of the indicators 20 and 23 correspond directly to the location of the contactor assembly 75 in the vertical and horizontal direction respectively. That is, the distance the indicators 20 and 23 are moved is the same distance the contactor assembly 75 is moved in the corresponding direction.

The contactor assembly 75 includes a plate 110 to which the rods 100 and 84 are slideably connected. A protrusion 112 extends upwardly to contact the printed circuit board of the intermediate layer, below described. A wire 113 is interconnected between the protrusion 112 and a potential, such as the positive potential, of a battery 115. Thus, the contacting member 112 exhibits a positive potential to be imparted to the intermediate layer printed circuit board. The other terminal, or minus potential of the battery, is common or is connected to ground.

Two incandescent bulbs or lamps 120 and 121 are mounted to the frame 71 in the indicator section 16. As shown, one side of the lamps 120 and 121 are connected to ground. The other end of the lamps 120 and 121 are connected by wires 122 and 123, respectively, to a switch means 125. The switch means 125 functions to select one or the other of the lamps 120 and 121, and may be conveniently a relay, as shown. The relay includes a switch 130 which is normally located in electrical contact with the wire 123 to energize the lamp 121, when appropriate, however, upon activating the relay, the switch 130 is brought into electrical contact with the other wire, 122, to energize the lamp 120 when appropriate.

The wire 64 from the lower rod member 51 of the probe 20, above described, is connected to the switch 130. Thus, since the return wire 65 from the contacting rod member 60 of probe 40 is connected to the positive potential of the battery 115, when the probe switch is closed by contact of rod members 51 and 60, the selected lamp 120 or 121 is energized.

The relay switch means 125 is operated by a coil 140 connected at one end to ground and at the other end to the wire 45, which is connected to the probe tip 42, as shown in FIG. 1.

It should be pointed out that although the switch means 125 has been illustrated as being a relay, any appropriate switch activated by a potential may be used. For example, a transistorized switch which could be energized to select one of wires 122 or 123 to the indicator lamps 120 or 121 may be used in place of the relay shown.

Likewise, although the indicator means are described as being lightbulbs or lamps 120 and 121, other indicator means, such as buzzers, vibrators, or the like may be equally advantageously used.

Figure 3:
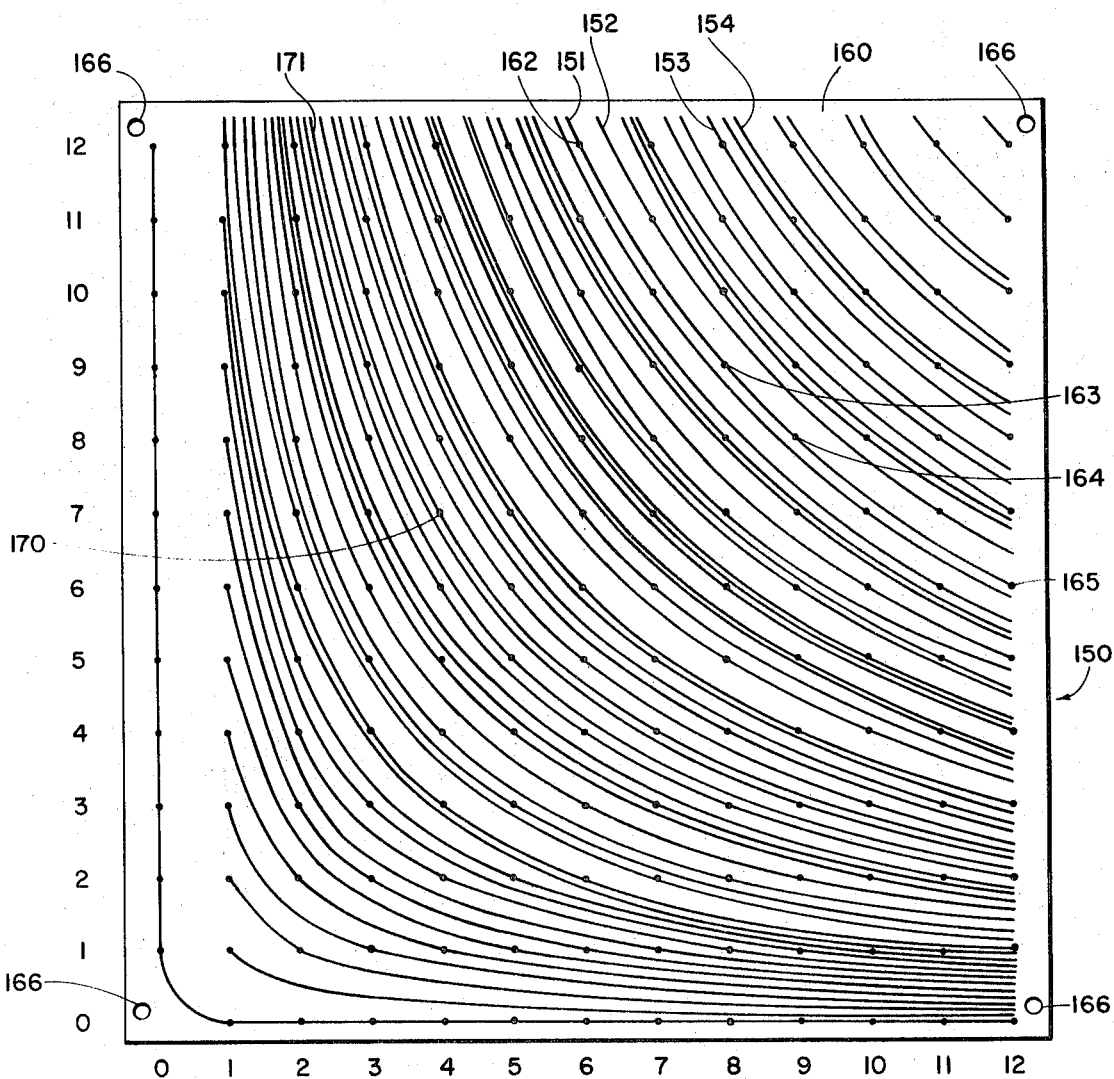
FIG. 3 is a plan view of a printed circuit board having a family of curves representing multiplication products for use in the apparatus of FIGS. 1 and 2.
Figure 4:
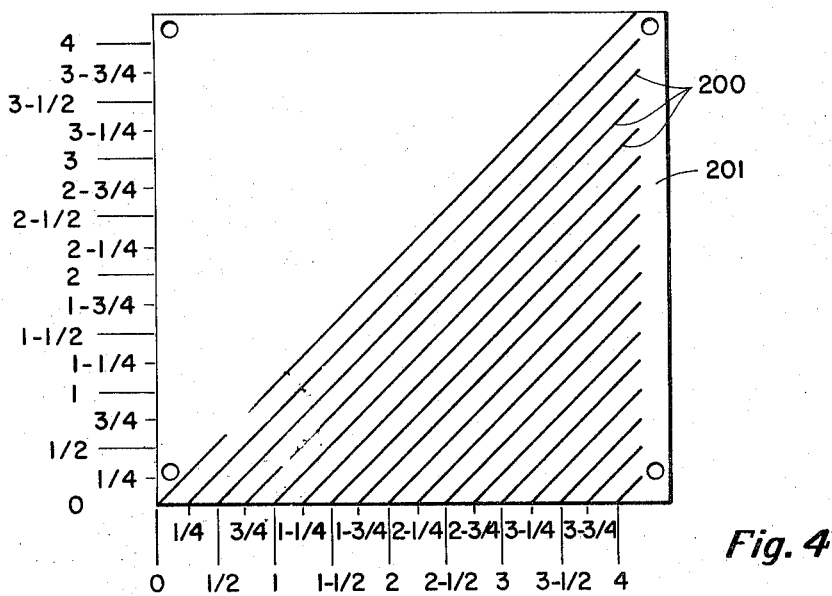
FIG. 4 is a plan view of a printed circuit board showing a family of curves representing the solution to addition equations for use in the apparatus of FIGS. 1 and 2.

Mounted between the upper frame 11 of FIG. 1 and the base lower frame 71 of FIG. 2, is a printed circuit board having a family of curves thereon indicating the solution to the desired problem. A printed circuit board 150 as shown in FIG. 3 illustrates a family of curves which would be usable in conjunction with the multiplication aspect of the apparatus, as shown in FIG. 1. The bottom side of the printed circuit board 150 is illustrated. A plurality of strips of electrically conducting material, such as those indicated by reference numerals 151, 152, 153, and 154 are etched or deposited onto the substrate 160. The contacting members 28 corresponding to various solutions, shown in FIG. 1, are each connected by wires (not shown) to appropriate strips.

To enhance or insure electrical contact between the protrusion 112 of the contactor assembly 75, dots can be provided, as shown, at the coordinate locations corresponding to the integer locations of the indicators 20 and 23, to present a larger contact area. For example, dots 162, 163, 164, and 165 are located along the strip 151. The dot 162 corresponds to the vertical distance of the number 12, the horizontal distance of the number 6 of the multiplier and multiplicand, respectively. (The numbers corresponding to the multiplier and multiplicand are shown for reference along the left and bottom edges of FIG. 3.) Likewise, the dot 163 corresponds to the distances 9 and 8, the dot 164 to the distances 8 and 9 and the dot 165 to the distances 6 and 12. The line 151, therefore, corresponds to any independent variables $x$ and 7 having the product solution $z = 72$.

The substrate 160 is fastened to the upper frame 12 by screws or the like (not shown) through holes 166.

Thus, in operation, as shown with reference to FIGS. 1, 2, and 3, the multiplier indicator 20 is located at the distance corresponding to a desired number, such as 7, and the indicator 23 is indicated at the distance corresponding to another desired number, such as 4. The contactor assembly 75 is automatically located by the strings 90 and 104 at corresponding $x$ and $y$ locations, whereby the contactor protrusion 112 is in electrical connection with the dot 170 on the strip 171 of the printed circuit board 150 corresponding to the product $7 \times 4 = 28$. Additionally, the strip corresponding to the product 28 is connected by a wire (not shown) to the solution indicating member 172, indicating a solution of 28, to be tested by probe tip 42.

Thus, in general operation, the printed circuit board 150 having etched thereon the desired family of solutions to the equation desired, such as the multiplication equation $xy = z$, shown in FIG. 3, is mounted to the top frame 11. The base member 70 is disposed adjacent the printed circuit board to enable the contactor assembly 75 to be located upon a selected one of the family of curves depending upon the location of the multiplier and multiplicand indicators 20 and 23. The contactor assembly 75 thereby imparts to the entire curve upon which it is in contact the positive potential of the battery 115 via the wire 113. The positive potential also exists, therefore, upon the contactor means such as one of the contactors 28, of the unique number representing the curve contacted.

The tip 42 of the probe assembly 40 is then brought into contact with any selected one of the contact members 28. If the particular contact member 28 with which the probe tip 42 is brought into contact is the incorrect solution, no positive potential will be applied to the relay coil 140 (see FIG. 2) and the switch 130 will remain in its normal selection position enabling only lamp 121, the "NO" lamps, to be energized. If, however, the probe tip 42 is brought into contact with the correct answer contact member, such as the contact 171 for the multiplicand equals 4 and the multiplier equals 7 problem shown in FIG. 1, the positive potential will be applied to the relay coil 140, thereby changing the state of the selector switch 130 to enable the "YES" lamp 120 to be energized. In either event, further pressure upon the probe tip 42 overcomes the spring bias of the spring 53 enabling the probe tip 42, insulating separator 50, and lower rod member 51, to be moved upwardly, to bring the lower rod member 51 into contact with the upper rod member 60. This completes the circuit between the positive terminal of the battery 115, through the wire 65, the upper rod member 60, lower rod member 51, the wire 64, the selector switch 130, and whichever wire 122 or 123 to respective bulbs 120 and 121 which are selected by the switch 130.

The multiplicand or multiplier or both knobs 21 and 24 can then be moved to define a new problem, and a new product solution sought in a similar fashion.

Although the invention has been described above with respect to a printed circuit board showing a family of curves to solve the equation $xy = z$, other solution boards with other families of curves can be equally advantageously employed. For example, in FIG. 4 a printed circuit board showing a family of curves of solutions to the equation $x - y = z$ is shown. The particular family of curves shown represents numbers and increments of ¼ up to the integer 4. The family of curves is a series of straight lines such as lines 200 which are etched or formed onto a substrate 201 of insulating material.

In the use of the printed circuit board having such different equation, the faceplate 12, shown in FIG. 1, would necessarily reflect in the input section 13, in one column, one of the numbers to be subtracted in increments of ¼, and in the other column, the other number to be subtracted. The solution section 15 would reflect the possible answers obtainable, and the indicator section 16 would remain essentially unchanged. The operation of the apparatus, however, would be the same, the particular input numbers being chosen by manipulating knobs 21 and 24 and the answer tested with the probe 40 in the solution section 15, the correct answer being indicated by a light flashing in the "YES" window 30 in the indicator section 16, and an incorrect solution being indicated by a light flashing in the "NO" window 31.

Still other equations can be programmed into the apparatus, for example, formulas for calculating interest amounts from given principle sums and given interest rates; for choosing appropriate trajectory paths from known range and distance inputs, and so forth.

Although the invention has been described and illustrated with a certain degree of particularity, it is understood that the present disclosure is made by way of example only and that numerous changes in the arrangement and conbination of parts may be resorted to without departing from the spirit and scope of the invention as hereinafter claimed.

What is claimed is:

1. Apparatus comprising,
   a board presenting a family of curves of electrically conducting material, each representing a solution of an equation having two independent variables,
   means for applying a voltage to a selected one of said curves,
   means for independently moving said voltage applying means in the direction of first and second coordinates, the distance along each of said coordinates representing the magnitude of one of said independent variables, whereby said voltage applying means is located adjacent and contacts the curve representing the solution to the equation having variables equal to the distances along said coordinates said voltage applying means is moved,
   probe means for establishing an electrical conduction path with a selected one of said curves,
   two display means, one of said display means being normally selected for energizing,
   first switch means activated by the potential on said selected curve conducted on said conduction path established by said probe means to select the other of said display means for energizing, and
   second switch means for applying a voltage to energize the selected one of said two display means.

2. The apparatus of claim 1 wherein said board is a printed circuit board.

3. The apparatus of claim 1 wherein said second switch means is carried by said probe means.

4. The apparatus of claim 1 wherein said probe means comprises a probe of electrically conducting material and a wire connected between said probe and said first switch means.

5. The apparatus of claim 4 wherein said probe additionally carries said second switch means.

6. The apparatus of claim 5 further comprising a plurality of electrically conducting members, and a plurality of wires connecting a respective one of said members and contacting a respective one of said curves, each of said electrically conducting members representing a possible solution to the equation represented by said family of curves, whereby upon operation of said second switch means if said electrically conducting probe is touched to one of said members representing an incorrect solution, said one display means ordinarily selected is energized, and if said electrically conducting probe is touched to one of said members representing a correct solutoin, said other display means is energized.

7. Apparatus for displaying upon choosing correct and incorrect solutions to an equation having two independent variables comprising,
   a frame having a centrally located opening,
   a board carried by said frame within said opening,
   a plurality of electrically conducting strips carried by said board, said strips being arranged to represent the solutions to said equation over a predetermined range of values of said two independent variables, at preselected coordinates thereof,
   a plurality of electrically conducting members each representing a possible solution to the equation,
   a plurality of electrically conducting wires interconnecting a respective one of said members and the strip representing the possible solution,
   a locatable contactor for applying a potential to one of said strips,
   means for locating said contactor independently in two directions, the magnitude of each direction representing the magnitude of one of said independent variables, whereby said contactor contacts the strip representing the solution to the equation having variables equal to the magnitude of the distances in said two directions,
   electrically energizable selectable means for indicating a correct solution,
   electrically energizable selectable means for indicating an incorrect solution,
   said incorrect solution indicating means being normally selected,
   an electrically conducting probe for contacting one of said electrically conducting possible solution indicating members,
   a first switch electrically connected to said probe and operated by said potential applied by said locatable contactor for selecting said correct solution indicating means, and
   a second switch for energizing said second solution indicating means.

8. The apparatus of claim 7 wherein said plurality of electrically conducting strips carried by said board are etched onto said board in the configuration of a family of curves, each curve representing the correct solution to an equation having two independent variables equal to the magnitude of their respective distances along perpendicular axes along said board to which said curve relates.

9. The apparatus as claimed in claim 8 wherein said second switch is carried by said electrically conducting probe, and is actuated by pressure upon said probe.

* * * * *